United States Patent
Ito (10) Patent No.: US 6,288,754 B1
(45) Date of Patent: Sep. 11, 2001

(54) YC SEPARATION CIRCUIT

(75) Inventor: Kazuki Ito, Yokosuka (JP)

(73) Assignee: Victor Company of Japan, Ltd., Yokohama (JP)

(*) Notice: Subject to any disclaimer, the term of this patent is extended or adjusted under 35 U.S.C. 154(b) by 0 days.

(21) Appl. No.: 09/025,867

(22) Filed: Feb. 19, 1998

(30) Foreign Application Priority Data

May 21, 1997 (JP) .................................................. 9-130782

(51) Int. Cl.$^7$ ...................................................... H04N 9/77
(52) U.S. Cl. ........................ 348/663; 348/665; 348/669; 348/670
(58) Field of Search .................................. 348/663, 664, 348/665, 666, 667, 668, 669, 670; H04N 9/77

(56) References Cited

U.S. PATENT DOCUMENTS

| | | | |
|---|---|---|---|
| 4,870,482 | 9/1989 | Yasuki et al. | |
| 4,924,305 | * 5/1990 | Nakagawa et al. | 348/638 |
| 5,003,389 | * 3/1991 | Isobe et al. | 348/669 |
| 5,243,422 | * 9/1993 | Owashi et al. | 348/459 |
| 5,333,054 | * 7/1994 | Tanaka et al. | 348/666 |
| 5,497,237 | * 3/1996 | Hosokawa et al. | 386/44 |
| 5,740,092 | * 4/1998 | Miyake et al. | 348/555 |

FOREIGN PATENT DOCUMENTS

| | | |
|---|---|---|
| 2286940 | 8/1995 | (GB) . |
| 7-154820 | 6/1995 | (JP) . |
| 7154820 | 6/1995 | (JP) . |

* cited by examiner

Primary Examiner—Reinhard J. Eisenzopf
Assistant Examiner—Trang U. Tran
(74) Attorney, Agent, or Firm—Connolly Bove Lodge & Hutz (57) ABSTRACT

A video composite signal is thinned by sub-Nyquist sampling signal to reduce a capacity of a memory, a carrier chrominance signal is separated from the thinned video composite signal by an inter-frame YC separation circuit 13, the first separated carrier chrominance signal is interpolated by horizontal interpolation circuit 25 to reproduce the lost data due to thinning, the interpolation data is compensated by an adding circuit 29 in accordance with a high frequency component in a second separated carrier chrominance signal separated without thinning detected by an intra-field YC separation circuit 16 and high frequency component extraction circuit 28 when an edge is present in the separated carrier chrominance signal from the inter-frame YC separation circuit 13, which is detected by an edge detection circuit 26, the first separated carrier chrominance signal is outputted at the timing corresponding to the sub-Nyquist sampling signal, the interpolation data is outputted at an interpolation timing when the edge is not present, and the compensated interpolation data outputted at the interpolation timing when the edge is-not present by a selection circuit 30, and the luminance signal is separated from the composite video signal with the outputted carrier chrominance signal by a subtractor 18.

8 Claims, 8 Drawing Sheets

YC SEPARATION CIRCUIT

BACKGROUND OF THE INVENTION

1. Field of the Invention

This invention relates to a YC separation circuit for separating an input composite video signal into a carrier chrominance signal (chrominance signal) and a luminance signal.

2. Description of the Prior Art

Figure 6:
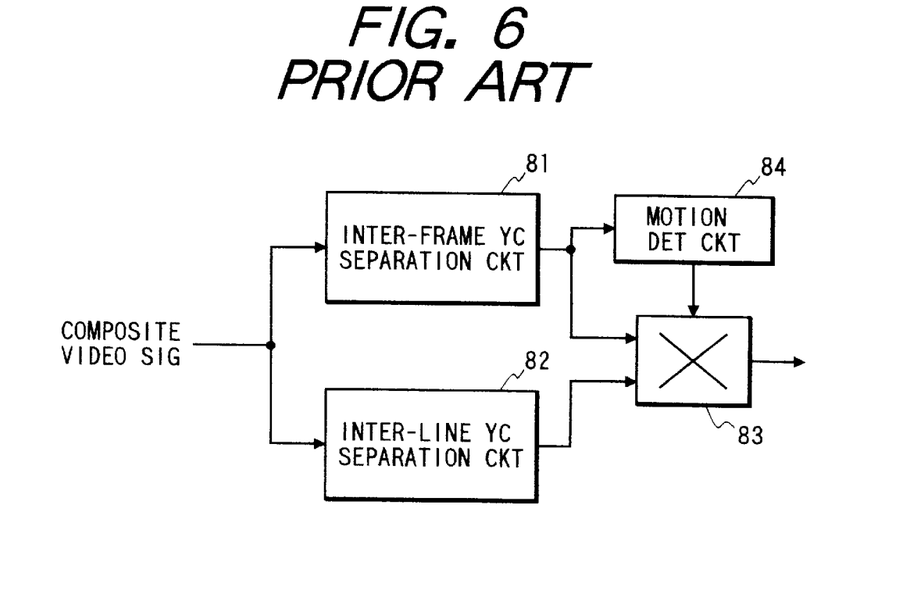
FIG. 6 is a block diagram of a prior art YC separator.

A YC separation circuit for separating an input composite video signal into a carrier chrominance signal and a luminance signal is known. FIG. 6 shows a block diagram of such a prior art YC separator. In the three-dimensional YC separator shown in FIG. 6, a color video signal (a composite video signal) in which a luminance signal and a carrier chrominance signal are multiplexed in a common band is supplied to an inter-frame YC separation circuit 81 and an inter-line YC separation circuit 82 where YC separation is performed using correlation between frames and correlation between lines respectively. The separated luminance signal and the separated carrier chrominance signals are supplied to the selector 83. The selector 83 outputs an output from either the output of the inter-frame YC separation circuit 81 or the output of the inter-line YC separation circuit 82 in accordance with a motion detection from a motion detection circuit 84.

Figure 7:
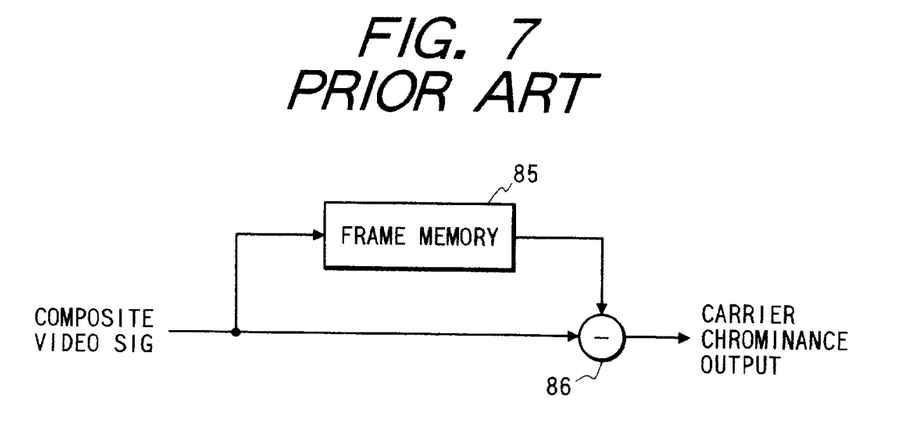
FIG. 7 is a block diagram partially showing the prior art inter-frame YC separation circuit 81 shown in FIG. 6.

FIG. 7 is a block diagram partially showing the prior art inter-frame YC separation circuit 81 shown in FIG. 6. The inter-frame YC separation circuit 81 separates the input composite video signal and extracts a carrier chrominance signal from the input composite video signal. That is, the input composite video signal is supplied to a frame memory 85 and delayed by one frame there and then, subtraction between the delayed input composite video signal and the non-delayed input composite video signal and only the carrier chrominance signal is separated, extracted, and outputted by a subtractor 86. Moreover, instead the subtractor 86, an adder can separate and extract the luminance signal from the input composite video signal.

Return to FIG. 6 again, the motion detection is performed by the motion detection circuit 84 on the basis of a frame difference signal of a low frequency components of the luminance signal outputted from the inter-frame YC separation circuit 81. The selector 83 selects the luminance signal and the carrier chrominance signal outputted from the inter-frame YC separation circuit 81 when an image portion where the image stops, i.e., it is judged that there is almost no motion by the motion detection detection circuit 84, and selects the luminance signal and the carrier chrominance signal outputted from the inter-line YC separation circuit 82 when the image portion where the image moves, i.e., it is judged that there is a motion.

Figure 8:
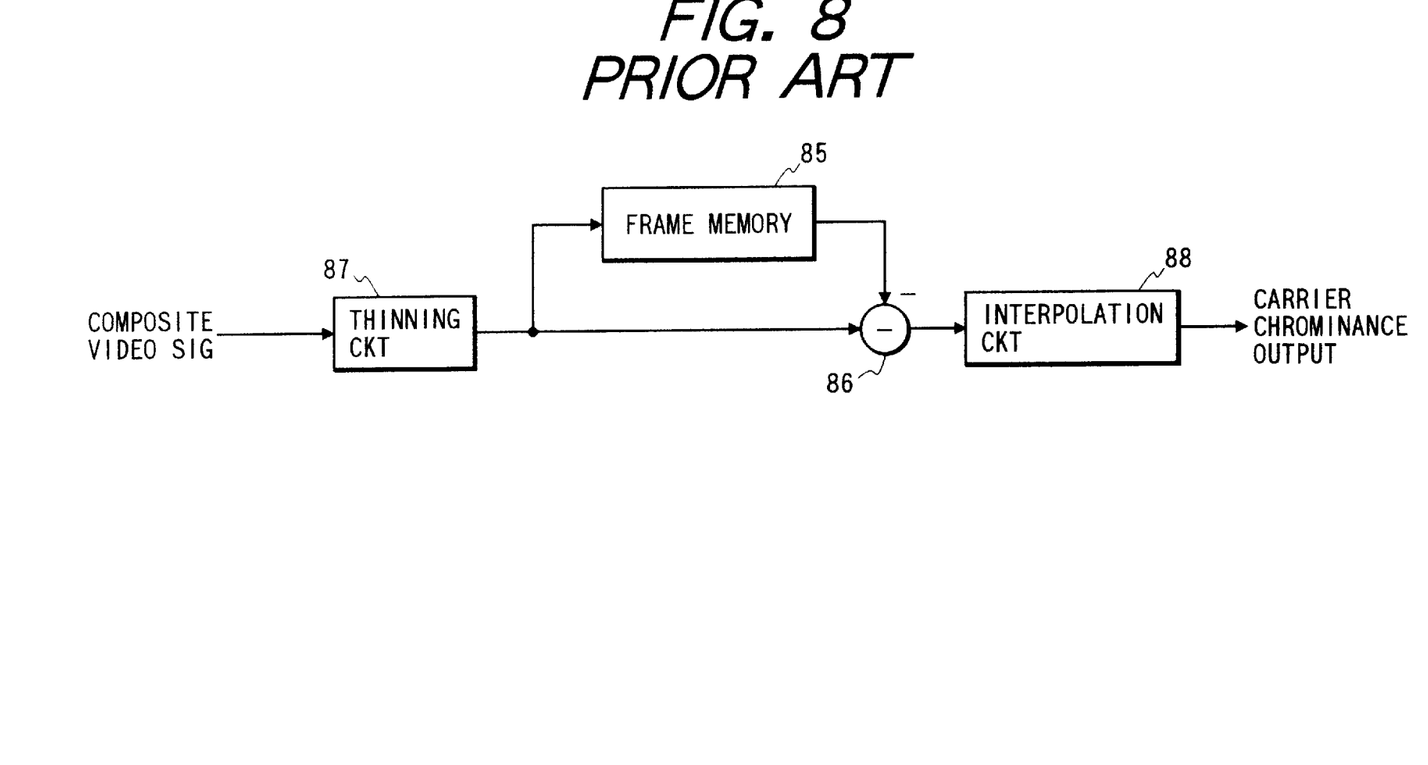
FIG. 8 is a block diagram of another prior art YC separator.

If the NTSC composite video signal is inputted to this circuit, because of its nature, in the case of the still picture, it is well known that the luminance signal can be perfectly separated by adding the video signal of the present frame to the video signal of one-frame previous frame and the carrier chrominance signal can be perfectly separated by subtraction between these signals. However, because this principle is not true to the image portion having a motion, it is necessary to switch to the intra-field (between lines, inter-line) YC separation to such an image including a motion. Therefore, the above-mentioned circuit structure requires a frame memory, so that a circuit scale becomes large. Then, to reduce a capacity of the frame memory 85 in FIG. 7, another prior art YC separator has been known, which further comprises a thinning circuit 87 on the input side of the frame memory 85. FIG. 8 is a block diagram of another prior art YC separator. In FIG. 8, the composite video signal to be supplied to the frame memory 85 is thinned and the output carrier chrominance signal of the subtractor 86 is interpolated by an interpolating circuit 88.

Still another prior art YC separator where interpolation is effected in the direction showing strong correlation (upwardly, downwardly, the right direction, or the left direction) using three lines of the data (thinned video data) is also known (for example, Japanese patent application provisional publication No. 7-154820).

Figure 9:
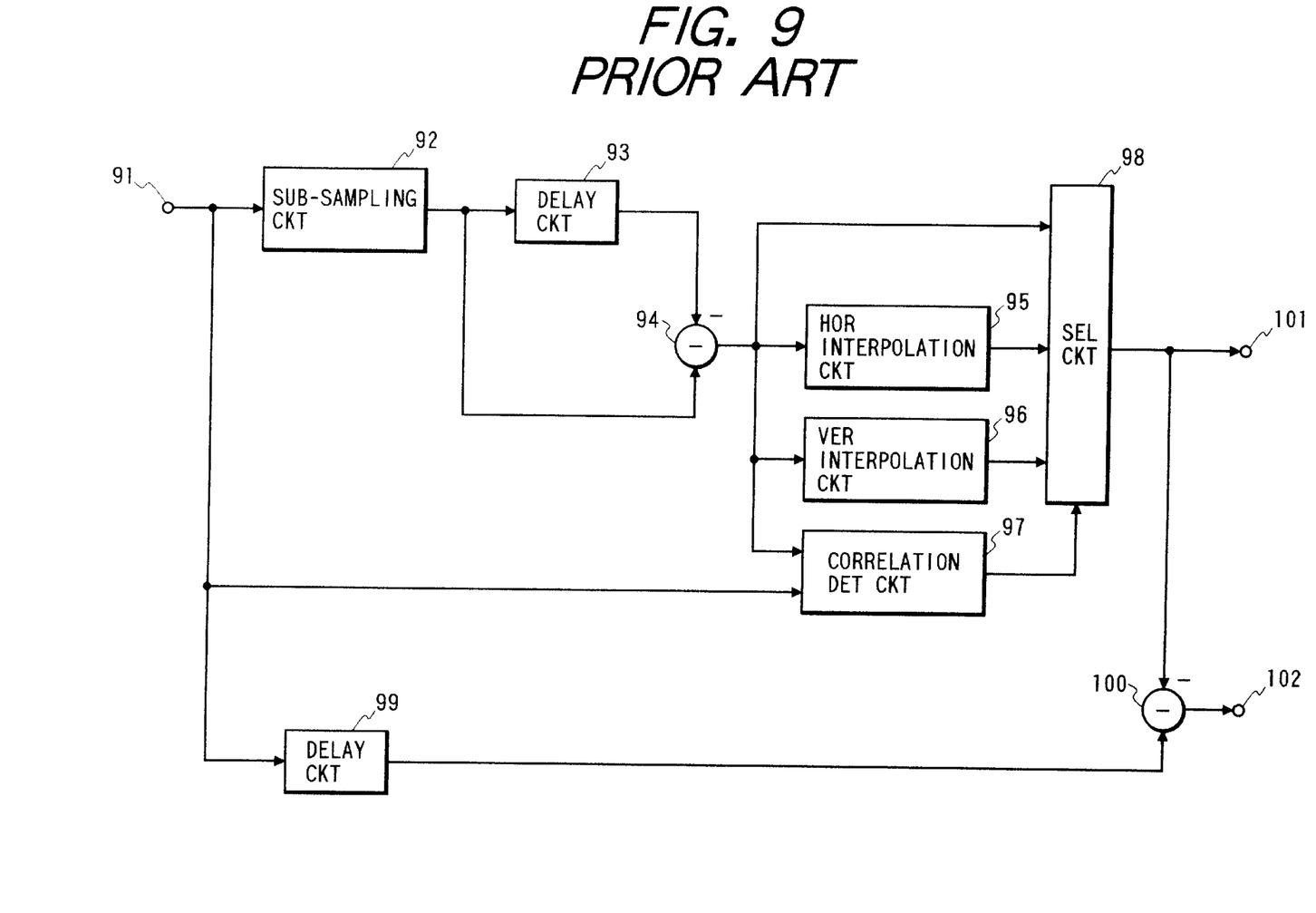
FIG. 9 is a block diagram of still another prior art YC separator.

FIG. 9 shows a block diagram of still another prior art YC separator disclosed in Japanese patent application provisional publication No. 7-154820. In FIG. 9, a composite video signal outputted from an input terminal 91 is sub-sampled in accordance with the cycle of the color sub-carrier by the sub-sampling circuit 92. The sampled signal is delayed by one frame by a delay circuit 93 and supplied to a subtraction circuit 94 and directly supplied to the subtraction circuit 94 to obtain only the carrier chrominance signal through subtraction.

The carrier chrominance signal from the subtraction circuit 94 is supplied to a horizontal interpolation circuit 95 and to a vertical interpolation circuit 96 respectively, where data of the carrier chrominance signal having signal phase in horizontal and vertical directions lost by the sub-sampling are interpolated. Moreover, the output carrier chrominance signal from the subtraction circuit 94 and the composite video signal from the input terminal 91 are supplied to a correlation detection circuit 97. The correlation detection circuit 97 detects which direction between the horizontal and the vertical direction data lost in the sub-sampling circuit 92 shows a stronger correlation in.

A selection circuit 98 selects the signal showing a stronger correlation from output signals from the subtraction circuit 94, the horizontal interpolation circuit 95, or the vertical interpolation circuit 96. Therefore, the selection circuit 98 outputs the carrier chrominance signal with the lost data due to the sub-sampling interpolated. The output of the selection circuit 98 is supplied to an output terminal 101 and supplied to a subtraction circuit 100 where subtraction is effected between the composite signal time-adjusted by a delay circuit 99 and the carrier chrominance signal to output a luminance signal. The luminance signal is supplied to an output terminal 102.

SUMMARY OF THE INVENTION

The aim of the present invention is to provide a novel YC separator.

According to the present invention there is provided a first YC separator comprising: a thinning circuit for thinning a composite video signal including a luminance signal and a carrier chrominance signal multiplexed in a common band in response to a sub-Nyquist sampling signal to output a thinned composite video signal; a first separation circuit for separating the carrier chrominance signal from the thinned composite video signal through inter-frame operation; a second separation circuit for separating the carrier chrominance signal from the composite video signal through intra-field operation; a first high frequency component detecting circuit for detecting a first high frequency component in the separated carrier chrominance signal from the first separation circuit; a second high frequency component detection circuit for detecting a second high frequency component in the carrier chrominance signal from the second separation circuit; a first interpolation circuit for generating a first interpolated carrier chrominance signal from the separated carrier chrominance signal from the first separation circuit at an interpolation timing defined by the sub-Nyquist sampling signal through linear-interpolating; a second interpolation circuit for selectively adding the detected second high frequency component to the first interpolated carrier chrominance signal in accordance with the detected first high frequency component to generate a second interpolated carrier chrominance signal; an outputting circuit for outputting the separated carrier chrominance signal from the first separation circuit at the timing corresponding to the sub-Nyquist sampling signal and the second interpolated carrier chrominance signal at the interpolation timing; and a luminance signal generation circuit for effecting subtraction between the composite video signal and an output of the outputting circuit to generate and output a separated luminance signal.

According to the present invention there is also provided a second YC separator comprising: a thinning circuit for thinning a composite video signal including a luminance signal and a carrier chrominance signal multiplexed in a common band in response to a sub-Nyquist sampling signal to output a thinned composite video signal; a first separation circuit for separating the carrier chrominance signal from the thinned composite video signal through inter-frame operation; a second separation circuit for separating the carrier chrominance signal from the composite video signal through intra-field operation; an edge detection circuit for detecting an edge image portion in the separated carrier chrominance signal from the first separation circuit; a high frequency component detection circuit for detecting a second high frequency component in the carrier chrominance signal from the second separation circuit; a first interpolation circuit for generating a first interpolated carrier chrominance signal from the thinned carrier chrominance signal at an interpolation timing defined by the sub-Nyquist sampling signal through linear-interpolating; a second interpolation circuit for adding the high frequency component to the first interpolated carrier chrominance signal to generate a second interpolated carrier chrominance signal; an outputting circuit for outputting the separated carrier chrominance signal from the first separation circuit at the timing corresponding to the sub-Nyquist sampling signal, the first interpolated carrier chrominance signal at the interpolation timing when the edge detecting circuit does not detect the edge image portion, and the second interpolated carrier chrominance signal at the interpolation timing when the edge detecting circuit detects the edge image portion; and a luminance signal generation circuit for effecting subtraction between the composite video signal and an output of the outputting circuit to generate and output a separated luminance signal.

In the first and second YC separators, the first interpolation circuit may comprise a horizontal interpolating circuit for averaging consecutive data of the separated carrier chrominance signal from the first separation circuit derived from consecutive two sampling timings of the sub-Nyquist sampling signal in the thinning circuit to generate the first interpolated carrier chrominance signal.

In the first and second YC separators, the second interpolation circuit may further include a median circuit for detecting consecutive data of the separated carrier chrominance signal from the first separation circuit derived from consecutive two sampling timings of the sub-Nyquist sampling signal in the thinning circuit and limiting a value of the second interpolated carrier chrominance signal with the detected consecutive data.

In the first and second YC separators, the second separation circuit may comprise a first three-line-logical comb filter with band pass limitation in the horizontal direction for separating the carrier chrominance signal from the composite video signal, a first high frequency component extracting filter for extracting a third high frequency component in the separated carrier chrominance signal from the first three-line-logical comb filter, a second three-line comb filter without band pass limitation in the horizontal direction for separating the carrier chrominance signal from the composite video signal, a second high frequency component extracting filter for extracting a fourth high frequency component in the separated carrier chrominance signal from the second three-line comb filter, a correlation detection circuit for detecting vertical correlation in the composite video signal, and a switch for outputting the third high frequency component as the second high frequency component when the vertical correlation is less than a reference and outputting the fourth high frequency component as the second high frequency component when the vertical correlation is not less than the reference.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Hereinbelow will be described an embodiment of this invention.

Figure 1:
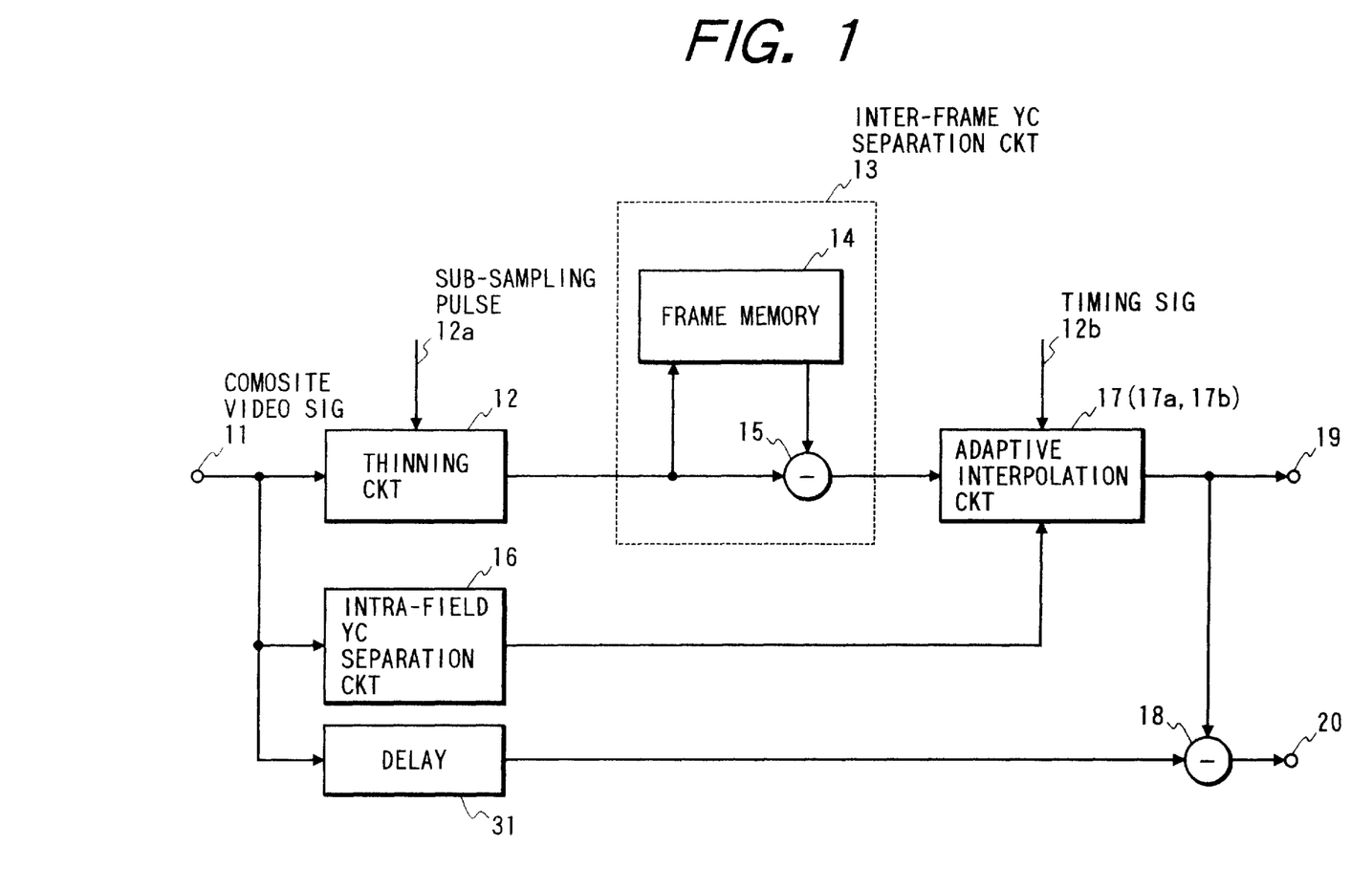
FIG. 1 is a general block diagram of a YC separator of an embodiment of this invention.

FIG. 1 is a general block diagram of a YC separator of the embodiment of this invention.

The YC separator of this embodiment comprises a thinning circuit 12 for thinning an input composite video signal, in which a luminance signal and a carrier chrominance signal are multiplexed in a common band, in response to a sub-sampling (sub-nyquist-sampling) pulse, a inter-frame YC separation circuit 13 for separating a first separated carrier chrominance signal from an output signal of the thinning circuit 12 through an inter-frame operation, a intra-field YC separation circuit 16 for separating a second separated chrominance signal from the composite video signal through an intra-field operation, an adaptive interpolation circuit 17 for generating an interpolation signal such that data lost by thinning said composite video signal is interpolated, extracting a high frequency component from the second separated carrier chrominance signal, adding the compensation signal to the first separated carrier chrominance signal to output a compensated signal, outputting either of the first separated signal, said interpolation signal, or the compensated signal as an output carrier chrominance signal, and a subtraction circuit 18 for effecting subtraction between said composite video signal and the output carrier chrominance signal and outputting a separated luminance signal. The first separated signal is outputted from the adaptive interpolation circuit 17 when said first separated signal is supplied. The interpolation signal is outputted from the adaptive interpolation circuit 17 when said first separated signal is not supplied, the interpolation signal is generated, and the high frequency component is not substantially extracted. The compensated signal is outputted from the adaptive interpolation circuit 17 when said first separated signal is not supplied, the interpolation signal is generated, and the high frequency component is extracted.

The inter-frame YC separation circuit-comprises a frame memory 14 supplied with the output of the thinning circuit 12 and a subtractor for effecting subtraction between an output of the frame memory 14 and the output of the thinning circuit 12.

The input composite video signal is thinned by the thinning circuit 12 in response to a sub-sampling (sub-nyquist-sampling) pulse 12*a*. The inter-frame YC separation circuit 13 separates the first separated carrier chrominance signal from the output signal of the thinning circuit 12 through the inter-frame operation. The intra-field YC separation circuit 16 separates the second separated chrominance signal from the composite video signal through an intra-field operation. The adaptive interpolation circuit 17 generates the interpolation signal such that data lost by thinning said composite video signal is interpolated, extracts a high frequency component from the second separated carrier chrominance signal, adds the compensation signal to the first separated carrier chrominance signal to output the compensated signal, and outputs either of the first separated signal, said interpolation signal, or the compensated signal as the output carrier chrominance signal. The subtraction circuit 18 effects subtraction between said composite video signal and the output carrier chrominance signal to output the separated luminance signal. The first separated signal is outputted from the adaptive interpolation circuit 17 when said first separated signal is supplied, that is when a timing pulse 12*b* having a predetermined phase relation with the sub-sampling pulse 12*a* is supplied. The interpolation signal is outputted from the adaptive interpolation circuit 17 when said first separated signal is not supplied, the interpolation signal is generated, and the high frequency component is not substantially extracted. This is because at this timing, the data is lost in the thinning circuit and the present image portion is flat (no high frequency component in the output of the intra-filed YC separation circuit). The compensated signal is outputted from the adaptive interpolation circuit 17 when said first separated signal is not supplied, the interpolation signal is generated, and the high frequency component is extracted. This is because at this timing, the data is lost in the thinning circuit 12 and the present image portion is an edge (a high frequency component is present in the output of the intra-filed YC separation circuit 16).

FIGS. 2A to 2E are illustrations of the embodiment illustrating operation of the adaptive interpolation circuit 17.

In the actual system of the YC separator, carrier chrominance signal is sampled at 4 fsc (fsc is a frequency of a color subcarrier). However, it is assumed in the illustrations in FIGS. 2A to 2E that the carrier chrominance is sampled at 2 fsc for convenience of explanation.

Figure 2A:
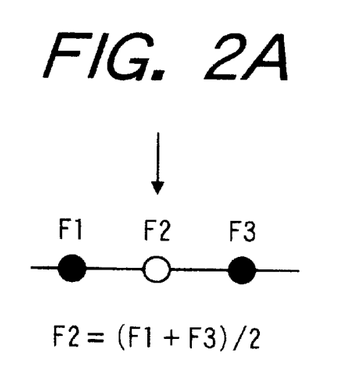
FIGS. 2A to 2E are illustrations of the embodiment of this invention illustrating operations of the adaptive interpolation circuit shown in in FIG. 1.

When the output signal of the inter-frame YC separation circuit 13 includes a low amount of high frequency components, that is when the present image portion is a flat, the data F2 which is lost in the thinning circuit 12 is interpolated by operating an arithmetic mean, that is, by (F1+F3)/2, wherein data F1 and F2 are sampled data by the thinning circuit in response to the sub-sampling pulse 12*a*. Because the present image portion is flat, the data F2 can be interpolated.

Figure 2B:
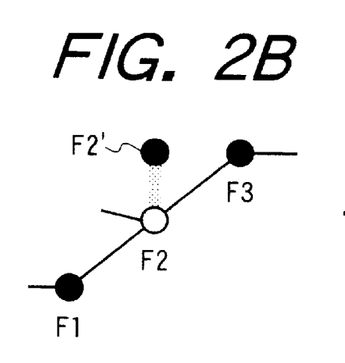
Figure 2C:
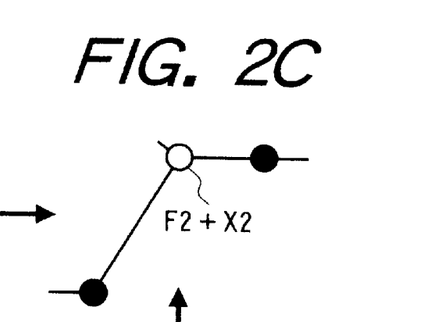

When the output signal of the inter-frame YC separation circuit 13 includes a high amount of high frequency components, that is, when the present image portion is in an edge, the interpolation signal must be compensated in accordance with the separated carrier chrominance signal from the intra-field Yc separation circuit 16 which is not subjected to thinning by the thinning circuit 12. In consideration of this, when the output signal of the inter-frame YC separation circuit 13 includes a high amount of high frequency components, as shown in FIG. 2B, data F2 linearly interpolated with adjacent two data F1 and F3 is added to a high frequency component X2 to generated the compensated interpolation data (F2+X2) in FIG. 2C which substantially agrees with the original data F2'.

Figure 2D:
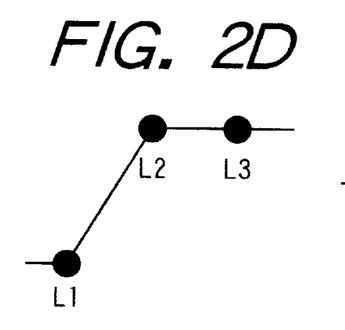
Figure 2E:
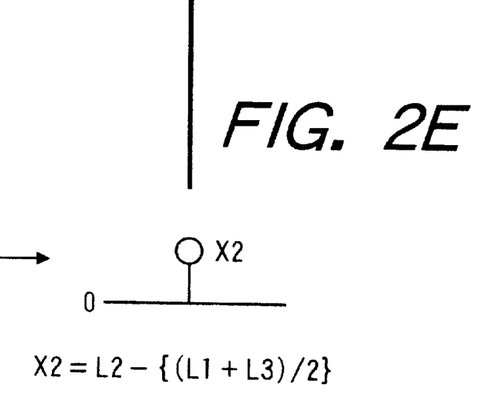

The high frequency component X2 is obtained from consecutive three data of the second separated carrier chrominance signal from the intra-field YC separation circuit 16 shown in FIG. 2D. That is, the high frequency component X2=L2−{(L1+L3)/2} as shown in FIG. 2E. In other words, the high frequency component X2 is obtained by subtraction between the data L2 and the mean of the data L1 and L3.

This is because if high frequency components are included such as an edge portion, a difference between the value obtained by linear-interpolation and the original data becomes large, the compensation id necessary. The difference is appear in a dot crawl on the result of the YC separation. Then, the difference (X2 in FIG. 2E) between an interpolation value {(L1+L3)/2} at the same timing obtained from the second separated carrier chrominance signal from the intra-field YC separation circuit 16 (which is not thinned because it does not processed by the thinning circuit 12) and the actual data L2 is added as a compensation value to the linearly-interpolated data F2 from the inter-frame YC separation by the inter-frame YC separation circuit 13.

However, because the YC separation in the intra-field operation is imperfect, the compensation result (F2+X2) is limited between two data F1 and F3 such that the compensation result does not exceed those two values of two data F1 and F3 which are basis of the interpolation. This is because if there is a high frequency pulsate component showing a value exceeding those two values, in consideration of the band characteristic of the carrier chrominance signal a probability that it is rather an error(cross color) in YC separation by the intra-field operation than the carrier chrominance signal is high.

As mentioned, in this invention, the data lost by thinning (carrier chrominance component) is made close to the original data (made close to the signal which would obtained by the system without thinning/interpolation) with interpolating characteristics switched in accordance with the frequency component (here, edge/flat), so that the inter-frame YC separation can be provided with a high quality with a lower capacity of memory without the dot crawl and cross color.

Figure 3:
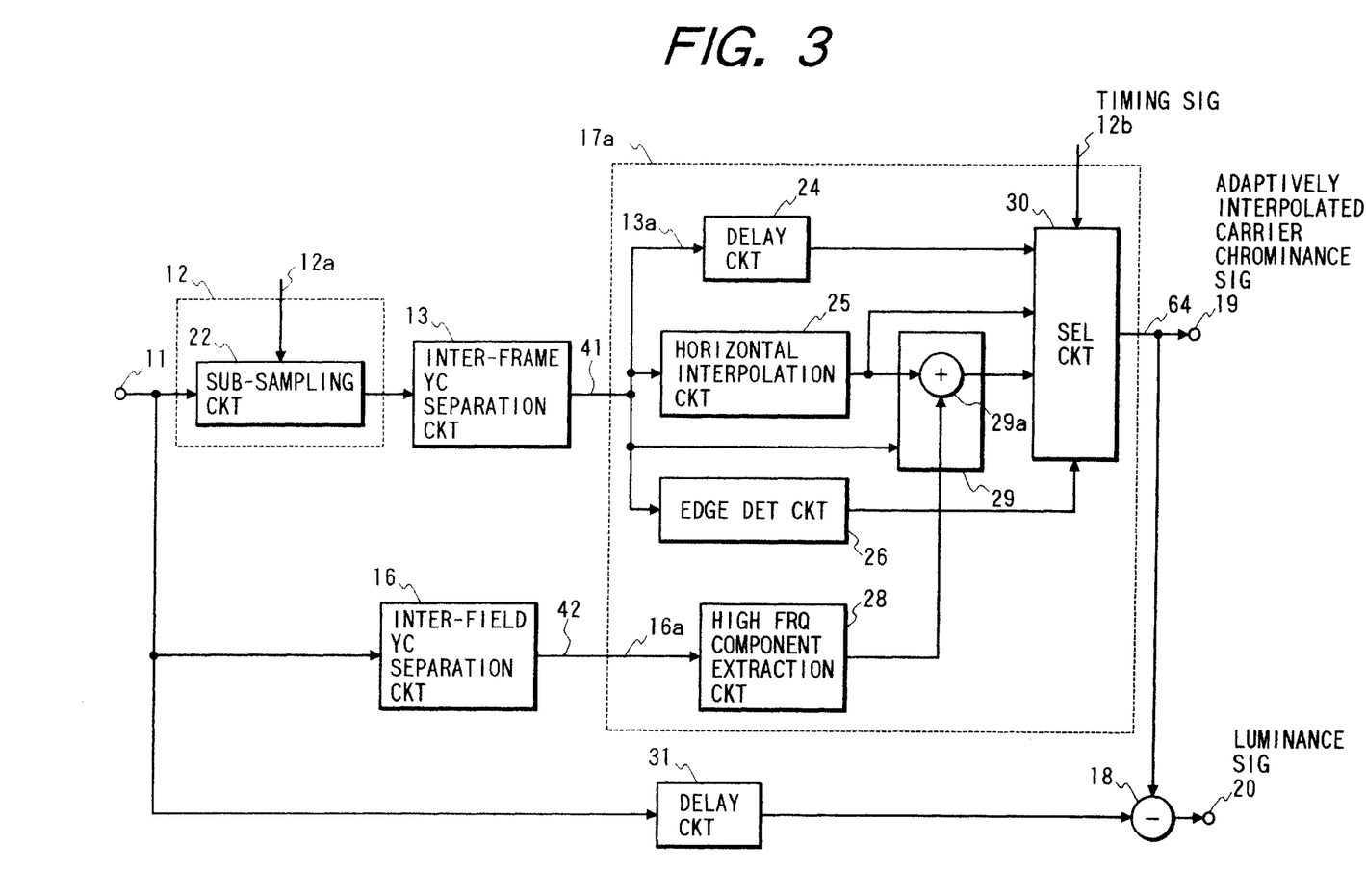
FIG. 3 is a block diagram of the YC separator of this embodiment.

FIG. 3 is a block diagram showing the YC separator of this embodiment into details.

The video signal, for example, an NTSC color video signal in which at a high frequency region of a luminance signal is multiplexed a carrier chrominance signal of a balanced modulation wave in a common band is inputted to the input terminal 11 is supplied to the thinning circuit 22 comprising a sub-sampling circuit 12, the intra-field YC separation circuit 16, and the delay circuit 31.

The sub-sampling circuit 22 effects sub-Nyquist sampling, i.e., sub-sampling, the video signal in response to the sampling pulse having a frequency lower than a frequency twice the maximum frequency and supplies the sampled signal to the inter-frame YC separation circuit 13. The inter-frame YC separation circuit 13 comprising the frame memory 14 and the subtractor 15 as shown in FIG. 1 cancels the luminance signal having the same phase every frame and separate the carrier chrominance signal from the luminance signal wherein the carrier chrominance signal has an inverted phase every frame.

The intra-field YC separation circuit 16 comprises a line memory supplied with the video signal and a subtractor for operating subtraction between the video signal and an output of the line memory and has the comb filter characteristic that pass bands at every odd number times a half of the horizontal scanning frequency $f_H$ and stop bands at every even number times a half of the horizontal scanning frequency $f_H$, so that the luminance signal is cancelled because the luminance signal has the tendency that it concentrates at frequencies every odd number times the horizontal scanning frequency $f_H$ and the carrier chrominance signal is extracted by additional operation because the carrier chrominance signal concentrates at every frequencies odd number times ½ $f_H$ because the chrominance sub-carrier frequency fsc is 455/2 $f_H$ and the phase of the carrier chrominance signal is inverted every one horizontal scanning period.

The carrier chrominance signal outputted from the intra-field YC separation circuit 16 is supplied to a high frequency component extraction circuit 28 which extracts the high frequency component X2 supplied to an adder 29a of an adding circuit 29 as the compensation signal.

On the other hand, the sub-sampled carrier chrominance signal from the inter-frame YC separation circuit 13 is supplied to a delay circuit 24, a horizontal interpolation circuit 25, an edge detection circuit 26, and the adding circuit 29. The delay circuit 24, the horizontal interpolation circuit 25, the edge detection circuit 26, the high frequency component extraction circuit 28, the adding circuit 29, and a selection circuit 30 form the adaptive interpolation circuit 17a.

The horizontal interpolation circuit 25 effects interpolation at a signal phase at which the data is lost by sub-sampling in the sub-sampling circuit 22 and supplies its output signal as an interpolated carrier chrominance signal to the adder 29a and to the selection circuit 30. The adder 29a adds the interpolated carrier chrominance signal to the high frequency component X2 from the high frequency component extraction circuit to supply an adaptively interpolated carrier chrominance signal (F2+X2) to the selection circuit 30.

The delay circuit 24 delays the sub-sampled carrier chrominance signal 13a from the inter-frame YC separation circuit 13 by the time interval for time-adjusting the sub-sampled carrier chrominance signal 13a with output signals of the horizontal interpolation circuit 25 and the adding circuit 29 supplied to the selection circuit 30.

The selection circuit 30 is supplied with the timing signal 12b having a predetermined phase difference from the sub-sampling pulse 12a and outputs the delayed carrier chrominance signal from the delay circuit 24 at the timing at which the data sampled by the sub-sampling circuit 22 is supplied thereto, and selects either of the output of the horizontal interpolation circuit 25 or the output of the adding circuit 29 at the timing corresponding to the timing at which the data lost by the sub-sampling circuit 22.

That is, the selection circuit 30 outputs the output of the horizontal interpolation circuit 25 when the video data represents a flat image portion (no edge is detected) and selects the output of the adding circuit 29 when an edge is detected by the edge detection circuit 26 at the timing corresponding to the timing at which the data lost by the sub-sampling circuit 22.

The output of the selection circuit 30 as an adaptive interpolated carrier chrominance signal is supplied to an output terminal 19 and to a subtractor 18. The subtractor 18 effecting subtraction between the video signal delayed by delay circuit 31 for time-adjusting and the adaptively interpolated carrier chrominance signal to output the luminance signal at an output terminal with the adaptively interpolated carrier chrominance signal and the chrominance signal in the video signal cancelled.

Figure 4:
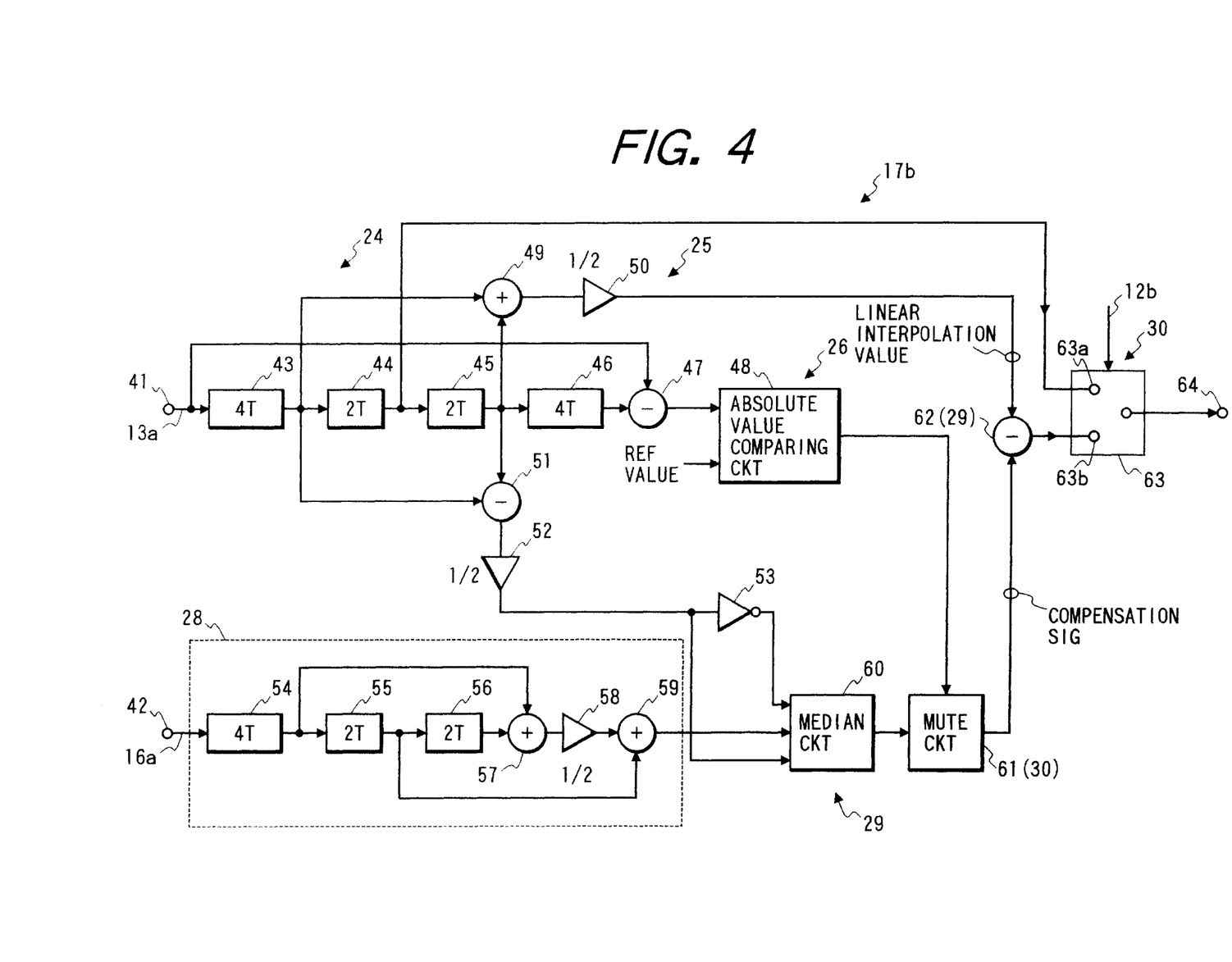
FIG. 4 is a block diagram of the adaptive interpolation circuit shown in FIG. 1.

The adaptive interpolation circuit 17 will be described more specifically. FIG. 4 is a block diagram of the adaptive interpolation circuit 17b shown in FIG. 1. Respective portions of the adaptive interpolation circuit 17b in FIG. 4 substantially shows detailed circuit structures of the adaptive interpolation circuit 17a in FIG. 3. However, there is a difference in connection between the adding circuit 29 and selection circuit 30 in FIG. 3 and a mute circuit 61, a subtractor 62, and the switch 63 in FIG. 4.

The sub-sampled carrier chrominance signal 13a is supplied to an input terminal of the adaptive interpolation circuit 17b and passed through a series of delay circuits 43, 44, 45, and 46 to provide a total delay interval of 12 T (T=1/(4 fsc)) and supplied to a subtractor 47. The delay circuit 43 has a delay interval of 4 T, the delay circuits 44 and 45 have a delay interval of 2 T, and the delay circuit 46 has a delay interval of 4 T . The subtractor 47 effects subtraction between the sub-sampled carrier chrominance signal 13a and an output of the delay circuit 46 delayed by 12 T from the sub-sampled carrier chrominance signal 13a. The subtraction result is supplied to an absolute value comparing circuit 48 which compares an absolute value of the subtraction result, i.e., the difference, with a reference value.

The absolute value comparing circuit 48 judges that the present image portion is an edge when the difference is larger than the reference and output H level and judges that the present image portion is not an edge, i.e., flat, when the difference is not larger than the reference and output L level. Therefore, the delay circuits 43 to 46, the subtractor 47, and the absolute value comparing circuit 48 form an edge detection-circuit 26.

On the other hand, an output of the delay circuit 43, that is, the sub-sampled carrier chrominance signal delayed by 4 T and an output of the delay circuit 45, that is, the sub-sampled carrier chrominance signal delayed by 8 T are summed by an adder 49. That is, the lost data by thinning by the sub-sampling circuit 22 is interpolated from two consecutive sampled data of the sub-sampled carrier chrominance signal with an interval of 4 T. An output of the adder 49 is multiplied with a coefficient of ½ by a multiplier 50 to obtain a mean value, i.e., an average value, as the interpolated data. Thus, the delay circuits 43 to 45, the adder 49 and the multiplier 50 form a horizontal interpolation circuit 25. The multiplier 50 may comprise a shift register for shifting every digit to the right by one digit to obtain multiplying by ½.

On the other hand, a subtractor 51 effects subtraction between the output of the delay circuit 43, that is, the sub-sampled carrier chrominance signal delayed by 4 T and an output of the delay circuit 45 which is the sub-sampled carrier chrominance signal delayed by 8 T. That is, the difference between two consecutive sampled data with an interval of 4 T is obtained. The difference is multiplied with a coefficient of ½ by a multiplier 52 to obtain a mean value of the difference and supplied directly to a median circuit 60 and supplied to the median circuit 60 through an inverter 53. Assuming that a value of an output of the multiplier 52 is A and the value of an output of the inverter 53 is –A, the median circuit 60 limits the data from an adder 59 mentioned later between –A and A.

On the other hand, the carrier chrominance signal 16a from the intra-field YC separation circuit 16 is supplied to an input terminal 42 of the adaptive interpolation circuit 17b and passed through a series of delay circuits 54, 55, and 56 to provide a total delay interval of 8 T and supplied to an adder 57. The delay circuit 54 has a delay interval of 4 T, the delay circuits 55 and 56 have a delay interval of 2 T. The adder 57 adds the carrier chrominance signal delayed by 8 T to the carrier chrominance signal delayed by 4 T. That is, consecutive two data of carrier chrominance signal with an interval of 4 T from the intra-field YC separation circuit 16 are summed by the adder 57 and the additional result is multiplied with a coefficient of ½ by a multiplier 58 to provide a mean value, i.e., an average value, which is supplied to an adder 59. The adder 59 adds the mean value from the multiplier 58 to an output of the delay circuit 55 delayed by 6 T.

This provides the high frequency component X2 of the carrier chrominance signal. That is, the delay circuit 54 to 56, the adder 57, the multiplier 58, and the adder 59 form the high frequency component extraction circuit 28. The high frequency component of the carrier chrominance signal from the adder 59 is supplied to the median circuit 60.

The median circuit 60 limits the high frequency component X2 from the adder 59 from –A (F1) to A (F3) and an output of the median circuit 60 is supplied to a mute circuit 61.

The mute circuit 61 supplies the high frequency component X2 from the median circuit 60 as it is to a subtractor 62 as the compensation signal when the absolute value comparing circuit 48 outputs H level, that is, it indicates that the present image portion is an edge and when the absolute comparing circuit 48 outputs L level, that is, it indicates that the present image is not an edge, the mute circuit 61 mutes the high frequency component X2 from the median circuit 60, i.e., supplies null data to the subtractor 62.

The subtractor 62 effects subtraction between the horizontal interpolated data from the multiplier and the compensation signal from the mute circuit 61 wherein the compensation signal has a phase difference from the horizontal interpolation data by 2 T, that is, they have a relation of inversion. Therefore, the subtractor 62 substantially effects summing between the horizontal interpolation data and the compensation signal. The substantial additional data of the horizontal interpolation data and the compensation signal is supplied to a contact 63b of the switch circuit 63.

More specifically, when the present image is an edge, which is detected by the edge detection circuit 26, the horizontal interpolation data from the multiplier 50 (horizontal interpolation circuit 25) is outputted by the switch 63 and when the present image is flat, which is detected by the edge detection circuit 26, the horizontal interpolation data is added to the compensation data from the mute circuit 61 and the substantial additional result is outputted by the switch 63.

The switch circuit 63 is supplied with the timing signal 12b having the predetermined phase relation with the sub-sampling pulse 12a and outputs the delayed carrier chrominance signal from the delay circuit 24 at an output 64 of the adaptive interpolation circuit 17b at the timing at which the data sampled by the sub-sampling circuit 22 is supplied thereto, and outputs the output of the subtractor 62 at the output 64 at the timing corresponding to the timing at which the data lost by the sub-sampling circuit 22.

As mentioned above, when an edge is detected, the additional signal of the horizontal interpolation data and the compensation signal (the high frequency component X2 of the carrier chrominance signal) is outputted by the subtractor 62 and when the present image is flat, only the horizontal interpolation data is outputted. Therefore, the mute circuit 61 and the switch circuit 63 form the selection circuit 30 and the subtractor 62 forms the adding circuit 29.

A modification will be described.

Figure 5A:
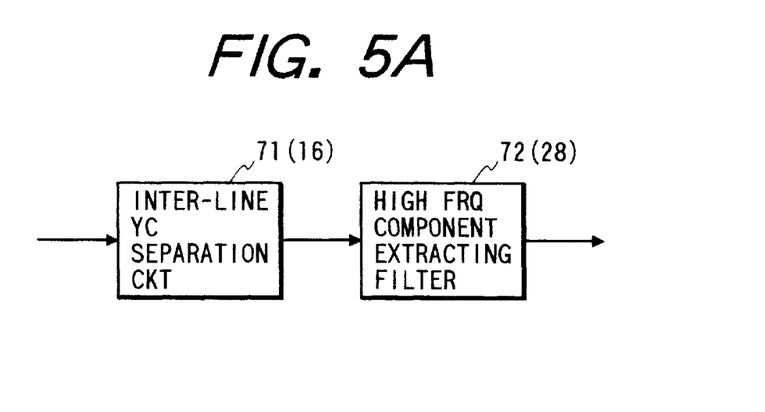
FIG. 5A is a block diagram of an inter-line YC separation circuit and a high frequency component extraction filter of the embodiment of this invention.
Figure 5B:
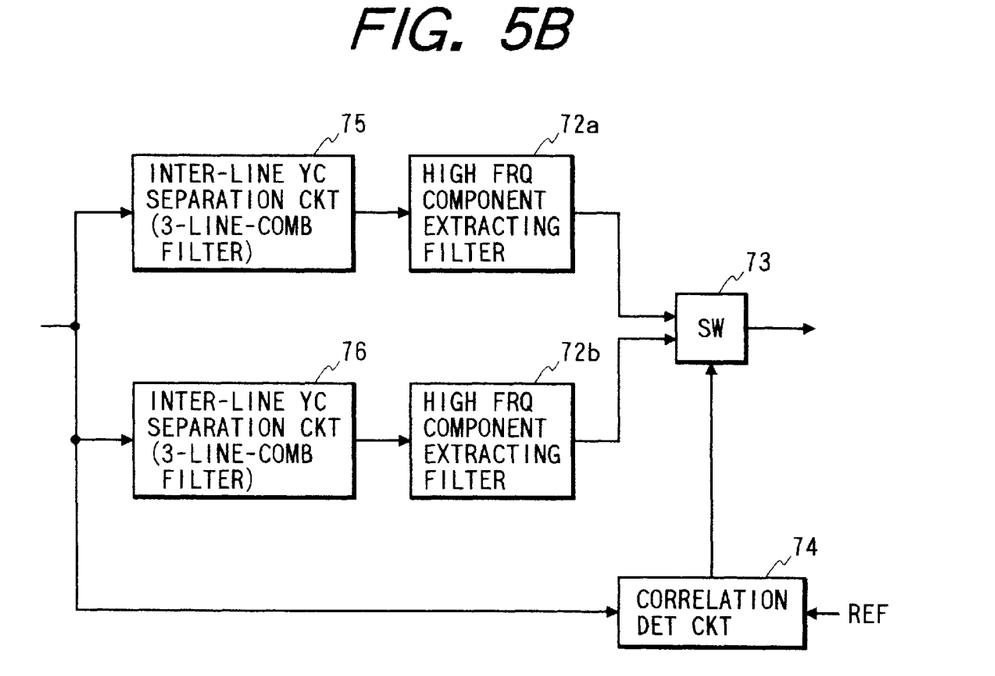
FIG. 5B is a block diagram of a modification of the inter-line YC separation circuit and the high frequency component extraction filter.

FIG. 5A is a block diagram of an-inter-line YC separation circuit 71 and a high frequency component extraction filter 72 which are respectively equivalent to the intra-field YC separation circuit 16 and to the high frequency component extraction circuit 28 shown in FIG. 3. FIG. 5B is a block diagram of a modification of the inter-line YC separation circuit 71 and the high frequency component extraction filter 72.

The compensation data is also generated by the inter-line YC separation circuits 75 and 76, and high frequency component extraction filters 72a and 72b, a switch 73, and a vertical correction detection circuit 74.

The video signal is supplied to the inter-line YC separator comprising a three-line logical comb filter 75', having a pass band in the horizontal direction, for separating a carrier chrominance signal, a high frequency component extracting filter 72a for extracting a high frequency component from the carrier chrominance signal from the three-line logical comb filter 75', a three-line logical comb filter 76' without a pass band in the horizontal direction, for separating a carrier chrominance signal, a high frequency component extracting filter 72b for extracting a high frequency component from the carrier chrominance signal from the three line logical comb filter 76', a switch 73 for outputting either of high frequency component from the high frequency component extracting filter 72a or the high frequency component extracting filter 72b in accordance with a switch control signal, a vertical correlation detection circuit 74 for detecting a vertical correlation to generate the switch control signal.

The inter-line YC separation circuit 75 has a superior YC separation characteristic than that of the inter-line YC separation circuit 76 in a general image. However, the inter-line YC separation circuit 76 has a superior YC separation characteristic than that of the inter-line YC separation circuit 75 in a specific image. Then, when the image is general, the switch selects the output of the high frequency component extracting filter 72a and when the present image is specific, the switch 73 selects the output of the high frequency component extracting filter 72b.

More specifically, when the correlation detection circuit 74 detects that there is correlation in the vertical direction and there is no correlation in the horizontal direction, the switch 73 selects the output of the high frequency component extracting filter 72a. This is because when the correlation detection circuit 74 detects that there is correlation in the vertical direction and there is no correlation in the horizontal direction, it is a tendency that the three-line comb filter 76' does not occur the dot crawl. However, it is possible to omit to detect the correlation in the horizontal direction.

As mentioned, the video composite signal is thinned by sub-Nyquist sampling signal to reduce a capacity of a memory, a carrier chrominance signal is separated from the thinned video composite signal by an inter-frame YC separation circuit 13, the first separated carrier chrominance signal is interpolated by horizontal interpolation circuit 25 to reproduce the lost data due to thinning, the interpolation data is compensated by an adding circuit 29 in accordance with a high frequency component in a second separated carrier chrominance signal separated without thinning detected by an intra-field YC separation circuit 16 and high frequency component extraction circuit 28 when an edge is present in the separated carrier chrominance signal from the inter-frame YC separation circuit 13, which is detected by an edge detection circuit 26, the first separated carrier chrominance signal is outputted at the timing corresponding to the sub-Nyquist sampling signal, the interpolation data is outputted at an interpolation timing when the edge is not present, and the compensated interpolation data is outputted at the interpolation timing when the edge is not present by a selection circuit 30, and the luminance signal is separated from the composite video signal with the outputted carrier chrominance signal by a subtractor 18.

What is claimed is:

1. A YC separator comprising:

thinning means for thinning a composite video signal including a luminance signal and a carrier chrominance signal multiplexed in a common band in response to a sub-Nyquist sampling signal to output a thinned composite video signal;

first separation means for separating said carrier chrominance signal from said thinned composite video signal through inter-frame operation;

second-separation means for separating said carrier chrominance signal from said composite video signal through intra-field operation;

first high frequency component detecting means for detecting a first high frequency component in the separated carrier chrominance signal from said first separation means;

second high frequency component detection means for detecting a second high frequency component in said carrier chrominance signal from said second separation means;

first interpolation means for generating a first interpolated carrier chrominance signal from the separated carrier chrominance signal from said first separation means at an interpolation timing defined by said sub-Nyquist sampling signal through linear-interpolating;

second interpolation means for selectively adding said detected second high frequency component to said first interpolated carrier chrominance signal in accordance with the detected first high frequency component to generate a second interpolated carrier chrominance signal;

outputting means for outputting the separated carrier chrominance signal from said first separation circuit at the timing corresponding to said sub-Nyquist sampling signal and said second interpolated carrier chrominance signal at said interpolation timing; and luminance signal generation means for effecting subtraction between said composite video signal and an output of said outputting means to generate and output a separated luminance signal.

2. The YC separator as claimed in claim 1, wherein said first interpolation means comprises a horizontal interpolating circuit for averaging consecutive data of the separated carrier chrominance signal from said first separation means derived from consecutive two sampling timings of said sub-Nyquist sampling signal in said thinning means to generate said first interpolated carrier chrominance signal.

3. The YC separator as claimed in claim 1, wherein said second interpolation means further includes median means for detecting consecutive data of the separated carrier chrominance signal from said first separation means derived from consecutive two sampling timings of said sub-Nyquist sampling signal in said thinning means and limiting a value of said second interpolated carrier chrominance signal with the detected consecutive data.

4. The YC separator as claimed in claim 1, wherein said second separation circuit comprises a first three-line-logical comb filter with band pass limitation in the horizontal direction for separating said carrier chrominance signal from said composite video signal, a first high frequency component extracting filter for extracting a third high frequency component in the separated carrier chrominance signal from said first three-line-logical comb filter, a second three-line-logical comb filter without band pass limitation in the horizontal direction for separating said carrier chrominance signal from said composite video signal, a second high frequency component extracting filter for extracting a fourth high frequency component in the separated carrier chrominance signal from said second three-line-logical comb filter, a correlation detection circuit for detecting vertical correlation in said composite video signal, and a switch for outputting said third high frequency component as said second high frequency component when said vertical correlation is less than a reference and outputting said fourth high frequency component as said second high frequency component when said vertical correlation is not less than said reference.

5. A YC separator comprising:

thinning means for thinning a composite video signal including a luminance signal and a carrier chrominance signal multiplexed in a common band in response to a sub-Nyquist sampling signal to output a thinned composite video signal;

first separation means for separating said carrier chrominance signal from said thinned composite video signal through inter-frame operation;

second separation means for separating said carrier chrominance signal from said composite video signal through intra-field operation;

edge detection means for detecting an edge image portion in the separated carrier chrominance signal from said first separation means;

high frequency component detection means for detecting a second high frequency component in said carrier chrominance signal from said second separation means;

first interpolation means for generating a first interpolated carrier chrominance signal from said thinned carrier chrominance signal at an interpolation timing defined by said sub-Nyquist sampling signal through linear-interpolating;

second interpolation means for adding said high frequency component to said first interpolated carrier chrominance signal to generate a second interpolated carrier-chrominance signal;

outputting means for outputting the separated carrier chrominance signal from said first separation circuit at the timing corresponding to said sub-Nyquist sampling signal, said first interpolated carrier chrominance signal at said interpolation timing when said edge detecting means does not detect said edge image portion, and said second interpolated carrier chrominance signal at said interpolation timing when said edge detecting means detects said edge image portion; and luminance signal generation means for effecting subtraction between said composite video signal and an output of said outputting means to generate and output a separated luminance signal.

6. The YC separator as claimed in claim 5, wherein said first interpolation means comprises a horizontal interpolating circuit for averaging consecutive data of the separated carrier chrominance signal from said first separation means derived from consecutive two sampling timings of said sub-Nyquist sampling signal in said thinning means to generate said first interpolated carrier chrominance signal.

7. The YC separator as claimed in claim 5, wherein said second interpolation means further includes median means for detecting consecutive data of the separated carrier chrominance signal from said first separation means derived from consecutive two sampling timings of said sub-Nyquist sampling signal in said thinning means and limiting a value of said second interpolated carrier chrominance signal with the detected consecutive data.

8. The YC separator as claimed in claim 5, wherein said second separation circuit comprises a first three-line-logical comb filter with band pass limitation in the horizontal direction for separating said carrier chrominance signal from said composite video signal, a first high frequency component extracting filter for extracting a third high frequency component in the separated carrier chrominance signal from said first three-line-logical comb filter, a second three-line-logical comb filter without band pass limitation in the horizontal direction for separating said carrier chrominance signal from said composite video signal, a second high frequency component extracting filter for extracting a fourth high frequency component in the separated carrier chrominance signal from said second three-line-logical comb filter, a correlation detection circuit for detecting vertical correlation in said composite video signal, and a switch for outputting said third high frequency component as said second high frequency component when said vertical correlation is less than a reference and outputting said fourth high frequency component as said second high frequency component when said vertical correlation is not less than said reference.

* * * * *